(12) United States Patent
Kumar

(10) Patent No.: US 12,541,543 B2
(45) Date of Patent: Feb. 3, 2026

(54) LARGE LANGUAGE MODEL-BASED INFORMATION RETRIEVAL FOR LARGE DATASETS

(71) Applicant: Intuit Inc., Mountain View, CA (US)

(72) Inventor: Rohit Kumar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 155 days.

(21) Appl. No.: 18/466,780

(22) Filed: Sep. 13, 2023

(65) Prior Publication Data

US 2025/0086215 A1    Mar. 13, 2025

(51) Int. Cl.
*G06F 16/334* (2025.01)
*G06F 16/31* (2019.01)
*G06F 16/34* (2025.01)

(52) U.S. Cl.
CPC .......... *G06F 16/3347* (2019.01); *G06F 16/31* (2019.01); *G06F 16/3344* (2019.01); *G06F 16/345* (2019.01)

(58) Field of Classification Search
CPC .. G06F 16/3347; G06F 16/3344; G06F 16/31; G06F 16/345
See application file for complete search history.

(56) References Cited

U.S. PATENT DOCUMENTS

| | | | | |
|---|---|---|---|---|
| 10,445,431 B1* | 10/2019 | Lev-Tov | ................ | G06N 5/02 |
| 11,442,914 B1* | 9/2022 | Kulikov | ................ | G06F 16/278 |
| 12,130,865 B2* | 10/2024 | Tan | ................ | G06F 18/29 |
| 2005/0223044 A1* | 10/2005 | Ashworth | ................ | G06F 16/29 |
| 2007/0217676 A1* | 9/2007 | Grauman | ................ | G06V 10/764 |
| | | | | 382/190 |
| 2016/0179945 A1* | 6/2016 | Lastra Diaz | ................ | G06F 16/284 |
| | | | | 707/739 |
| 2020/0311542 A1* | 10/2020 | Wang | ................ | G06N 5/02 |
| 2020/0327683 A1* | 10/2020 | Yang | ................ | G06T 7/246 |
| 2021/0117459 A1* | 4/2021 | Tan | ................ | G06F 16/3347 |
| 2022/0114270 A1* | 4/2022 | Wang | ................ | G06F 9/5027 |

(Continued)

OTHER PUBLICATIONS

Jegou, Hervé, et al. "Faiss: A Library for Efficient Similarity Search." Meta, Mar. 29, 2017, available at https://engineering.fb.com/2017/03/29/data-infrastructure/faiss-a-library-for-efficient-similarity-search/.

(Continued)

*Primary Examiner* — Mark E Hershley
(74) *Attorney, Agent, or Firm* — Dinsmore & Shohl LLP

(57) ABSTRACT

Certain aspects of the disclosure provide techniques for information retrieval for large datasets. A method comprises receiving input text files and a query for the files; obtaining an index associated with the input text files to process the query, wherein: the index comprises key-value mappings, each key of a respective mapping identifying a voronoi cell of the index, and each value of a respective mapping identifying vector embeddings associated with text files associated with a voronoi cell of the index; creating a query embedding based on the query; identifying a first key-value mapping having a first key associated with a first voronoi cell in the index and corresponding to the query embedding; obtaining a set of vector embeddings associated with the first value; comparing the query embedding to the set of vector embeddings to determine closest vector embeddings; and generating a textual output based on the closest vector embeddings.

20 Claims, 6 Drawing Sheets

(56) References Cited

U.S. PATENT DOCUMENTS

| | | | | |
|---|---|---|---|---|
| 2022/0165356 | A1* | 5/2022 | Bepler | G06F 16/24534 |
| 2022/0188365 | A1* | 6/2022 | Zhang | G06Q 10/0631 |
| 2022/0188366 | A1* | 6/2022 | Song | G06F 40/40 |
| 2023/0035337 | A1* | 2/2023 | Tan | G06F 16/9024 |
| 2023/0055429 | A1* | 2/2023 | Pasternack | G06F 16/9532 |
| 2024/0095242 | A1* | 3/2024 | Miller | G06F 16/248 |
| 2024/0378228 | A1* | 11/2024 | Liu | G06F 16/3347 |
| 2025/0053748 | A1* | 2/2025 | Fayyaz | G06F 40/35 |
| 2025/0061136 | A1* | 2/2025 | Saini | G06N 3/045 |
| 2025/0086215 | A1* | 3/2025 | Kumar | G06F 16/345 |

OTHER PUBLICATIONS

Fenniak, Mathieu. "PyPDF2." PyPI, Dec. 31, 2022, available at https://pypi.org/project/PyPDF2/.

Chase, Harrison. "LangChain API Reference." LangChain, available at https://api.python.langchain.com/en/latest/api_reference.html. Sep. 13, 2023.

Chase, Harrison. "Question Answering." LangChain, available at https://python.langchain.com/docs/use_cases/question_answering.html. Sep. 13, 2023.

Chase, Harrison. "Chains." LangChain, available at https://python.langchain.com/docs/modules/chains/. Sep. 13, 2023.

Briggs, James. "Introduction to Facebook AI Similarity Search (Faiss)." Pinecone, available at https://www.pinecone.io/learn/series/faiss/faiss-tutorial/. Sep. 13, 2023.

\* cited by examiner

US 12,541,543 B2

LARGE LANGUAGE MODEL-BASED INFORMATION RETRIEVAL FOR LARGE DATASETS

BACKGROUND

Field

Aspects of the present disclosure relate to information retrieval for large datasets.

Description of Related Art

Information retrieval (IR) is concerned with activities related to the organization of, processing of, and access to information of various forms and formats. An IR system allows users to communicate with the system in order to find information-text, graphic images, sound recordings, video, etc. that meet their specific needs. For example, the objective of a text IR system may be to enable users to find information from an organized collection of documents that is relevant to answer a query, where a query is a question or a request for such information.

Existing IR systems include traditional search engines, such as Google® and Bing®, as well as searching tools like Expedia® (e.g., flight searching tool) and/or LinkedIn® (e.g., job searching tool), to name a few. These search engines and tools are primarily designed to process explicit queries (or keywords) and retrieve relevant information based on those queries. The search engines rely on algorithms and ranking mechanisms to analyze web pages, index their content, and determine their relevance to specific search queries. Search engines and tools aim to provide users with a list of ranked results that best match their queries, often using factors such as keyword relevance to determine the ranking.

Reliance on explicit queries or keywords for IR, however, limits the type of queries that existing search engines and tools are able to comprehend.

SUMMARY

Certain aspects provide a method comprising receiving, from a user, a plurality of input text files; receiving, from the user, a query for the plurality of input text files; obtaining an index associated with the plurality of input text files to process the query, wherein: the index comprises a plurality of key-value mappings, each key of a respective key-value mapping of the plurality of key-value mappings identifying a voronoi cell of the index, and each value of a respective key-value mapping of the plurality of key-value mappings identifying vector embeddings associated with a plurality of text files associated with a voronoi cell of the index; creating a query embedding using a trained encoder model based on the query, wherein the query embedding has a lower dimensionality than the query; identifying a first key-value mapping comprising a first key and a first value, the first key associated with a first voronoi cell in the index and corresponding to the query embedding; obtaining a first set of vector embeddings associated with the first value of the first key-value mapping; comparing the query embedding to the first set of vector embeddings to determine one or more closest vector embeddings; and generating a textual output based on the one or more closest vector embeddings.

Certain aspects provide another method comprising determining to merge a first index associated with a first plurality of text files stored in memory and a second index associated with a second plurality of text files to thereby create a merged index, wherein: the first index comprises a plurality of first key-value mappings, each first key of a respective first key-value mapping of the plurality of first key-value mappings identifying a first voronoi cell of the first index, and each first value of a respective first key-value mapping of the plurality of first key-value mappings identifying first vector embeddings associated with the first plurality of text files associated with a first voronoi cell of the first index, and the second index comprises a plurality of second key-value mappings, each second key of a respective second key-value mapping of the plurality of second key-value mappings identifying a second voronoi cell of the second index, and each second value of a respective second key-value mapping of the plurality of second key-value mappings identifying second vector embeddings associated with the second plurality of text files associated with a second voronoi cell of the second index; processing the first plurality of text files and the second plurality of text files into a plurality of chunks; embedding each of the plurality of chunks with a trained encoder model to produce third vector embeddings; generating the merged index based on the third vector embeddings and a distance metric; and partitioning the merged index into a plurality of third voronoi cells based on the third vector embeddings.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
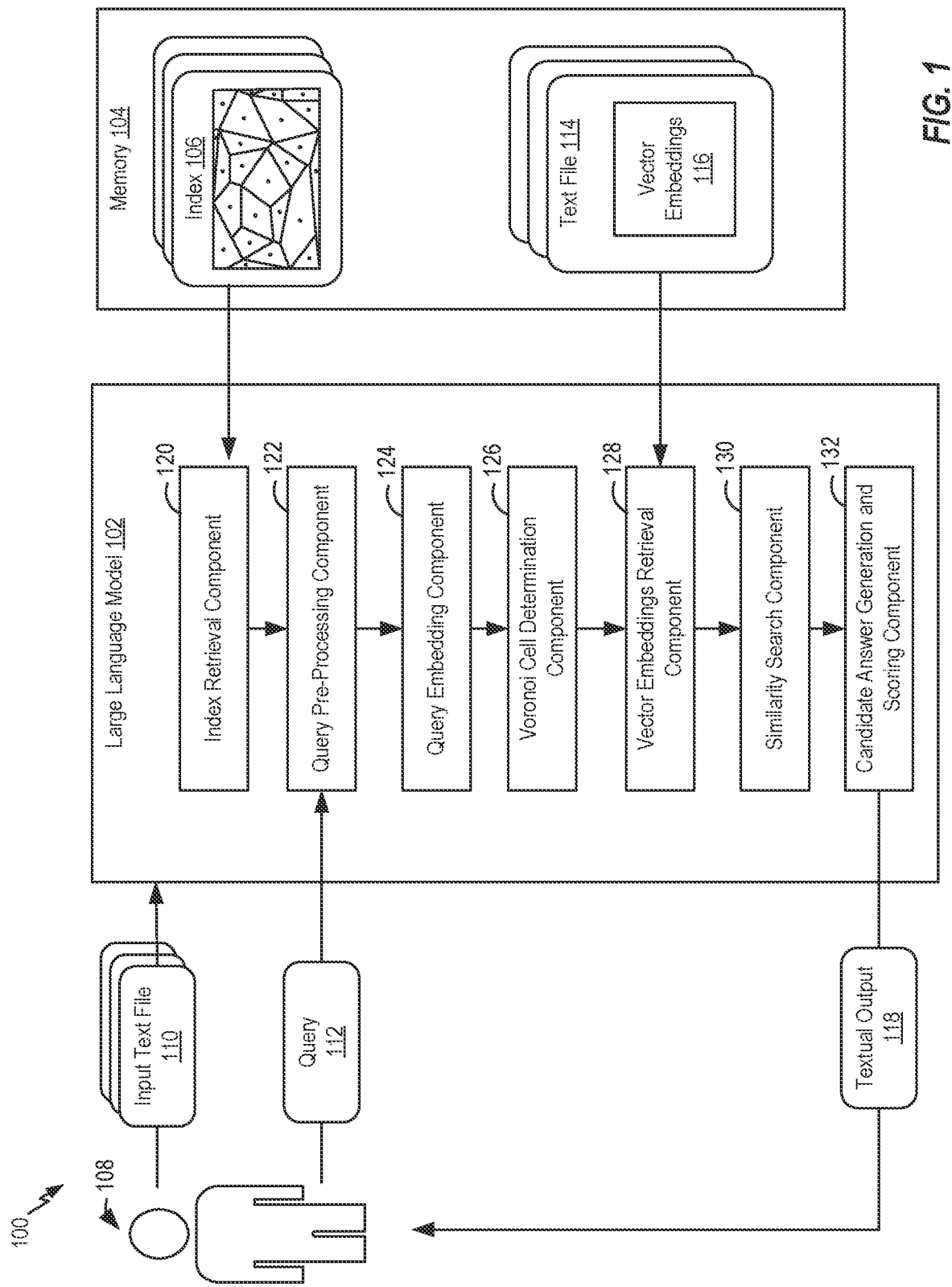
FIG. 1 depicts an example information retrieval system configured to perform retrieval augmented generation using an index partitioned into a plurality of voronoi cells.

Large language model (LLM)-based IR systems have the ability to comprehend natural language queries and generate personalized responses. A natural language query is input into an LLM-based IR system that consists of terms or phrases spoken normally and/or entered as they might be spoken, without any special format and/or alteration of syntax. In some cases, natural language queries are conducted through a text and/or voice interface.

An LLM is a type of machine learning model that can perform a variety of natural language processing (NLP) tasks, such as generating and classifying text, answering questions in a conversational manner, and translating text from one language to another. NLP makes it possible for software to "understand" typical human speech or written content as input into the LLM-based IR system and respond to it. A fundamental benefit of LLM-based IR systems over existing search engines and tools lies in their capacity to comprehend intricate queries and produce personalized responses.

In some cases, LLM-based IR systems are configured to perform retrieval augmented generation (RAG) (e.g., referred to herein as "RAG systems"). RAG is an IR approach that combines the power of LLMs with external knowledge sources to generate more informed and/or contextually relevant responses. For example, a RAG system may be designed with a retrieval-based component and a generative component. The retrieval-based component may retrieve relevant documents, passages, and/or text from a database (e.g., a vector database) and/or corpus based on receiving an input query. The retrieved documents, passages, and/or text may be concatenated as context with the original input query and fed to the generative component (e.g., a text generator) of the RAG system, which in turn produces text output for the input query. By combining the input query with the contextual documents, the LLM receives a comprehensive input that incorporates both the user's query and the relevant information from external sources. This method helps to reduce the risk of generating irrelevant responses, as well as improves the overall accuracy and/or relevance of the response. Additionally, the retrieved information may be used to enrich a typical LLM-generated response to the same input query (e.g., without RAG, an LLM is only as smart as the data it was trained on), thereby making the generated response more informative and useful for a user which initiated the query.

Such RAG systems are increasingly being used in the development of chatbots (e.g., such as GhatGPT owned by OpenAIR), where a chatbot is an automated natural language-based chat tool that uses, for example, a generative pre-trained transformers (GPT) to generate outputs. Chatbots, in this context, may allow users (e.g., including less technologically savvy individuals) to retrieve, via a chat interface, data using natural language.

A technical challenge when using RAG systems, is determining the amount of context that can be effectively retrieved and passed to the generative component of the RAG system. While RAG allows for the incorporation of contextual information from external sources (e.g., databases), there are practical constraints on the amount of context that can be utilized. In particular, text/documents that can be processed by the LLM are often limited due to computational and/or memory constraints.

For example, LLMs of RAG systems generally have a fixed limit on the number of tokens the LLMs can process as input and generate as output (e.g., in a single interaction). A token is a unit of text that is used to represent a word, phrase (e.g., multiple words), or other piece of text (e.g., the phrase "information retrieval system" may consist of four tokens: "information," "retrieval," "system," and " " (a space)). Token limits are relevant because they can affect the performance of LLMs. If the token limit is too high, processing by the LLM may be slow and very high computational power may be required. On the other hand, if the token limit is too low, the LLM may not be able to generate the desired output. Token limits present a technical problem for RAG systems where the documents, passages, and/or text retrieved and passed to the LLM to generate a response are large. For example, where the token limit is set for 1,000, and a 10,000 word document is retrieved, less than all of the document may be tokenized for generating a response, thereby leading to a less accurate or contextually inappropriate response. Further, in some cases, too much context may overwhelm the LLM. Thus, a technical challenge of RAG systems involves balancing the ability to provide sufficient context for query answering while maintaining efficient processing and generation capabilities.

MapReduce is one existing retrieval mechanism designed to help achieve this balance, especially in cases where the data used to augment a query response is large (e.g., large external datasets and/or a large corpus). MapReduce is a programming model that allows for parallel and distributed processing on large datasets. MapReduce may be performed on a cluster made up of a plurality of nodes (e.g., physical and/or virtual machines). MapReduce techniques implemented in RAG systems work by distributing documents (and/or text) (e.g., from a large dataset and/or corpus) across nodes in the cluster for processing to determine a similarity of each document (or text) to an input query for purposes of generating a response to the query.

For example, in some RAG systems, external data (e.g., documents in an external database, in this example) used to augment a query response to a user-submitted query and the user-submitted query, itself, are converted into a compatible format to allow for the performance of a relevancy search to identify most relevant document(s) related to the user-submitted query. Such conversion may involve converting the user-submitted query and the documents in the external database to numerical representations using embedding language models. Embedding is the process by which text is given numerical representation in a vector space. The RAG system then compares the embeddings of the user query against embeddings of each document in the external database to identify documents/content relevant to the user-submitted query. With the use of MapReduce techniques, such vector comparisons are performed in a distributed manner across a plurality of nodes (e.g., machines). Accordingly, MapReduce techniques allow for the processing of large amounts of external data for RAG. Further, MapReduce enables fast processing of large amounts of data, thereby improving query response times in RAG systems. However, a technical problem associated with the use of MapReduce techniques relates to scalability given the amount of infrastructure needed to perform such techniques increases as the external data, which may be used to augment query responses, increases.

Embodiments described herein overcome the aforementioned technical problems and improve upon the state of the art by providing an LLM-based system configured to perform RAG using an index (e.g., associated with one or more input text files). For example, the LLM-based system described herein is configured to obtain an index associated with a plurality of input text files (e.g., a special data structure built on top of vector embeddings of at least the input text files) to process a query related to at least one of the input text files. The index is partitioned into a plurality of voronoi cells, where each voronoi cell contains similar vector embeddings representing text of the input text files. The LLM-based system identifies a voronoi cell of the index with a greatest similarity to an embedding created for the query, and uses vector embeddings belonging to this voronoi cell to perform a similarity search and thus generate textual output in response to the received query. In other words, less than all vector embeddings associated with the input text files are searched to produce a query response.

Although techniques herein are described with respect to input text file(s) and textual output, and more specifically generating textual output using an index previously created for input text file(s), the techniques may be similarly applied to images, videos, and/or the like such that output is generated for a query using an index created for one or more images, videos, and/or the like.

As an illustrative example, a financial manager at a company may upload, via an interface of an LLM-based system, five 10,000 word documents. The context of these documents may provide information about financial planning for various departments in the company for the upcoming year. To quickly determine a synopsis of these documents, without needing to read through and identify key points in each document, the manager may request that the LLM-based system provide a summary of the information contained in the five uploaded documents (e.g., via submission of a query to the LLM). The LLM-based system may be configured to generate a summary of the five documents (e.g., textual output) in response to receiving the query, and provide this summary to the manager.

An index used by the system to generate textual output may be a pre-created, key-value data structure (e.g., dictionary) comprising multiple key-value mappings (also referred to as "key-value pairs") associated with a plurality of text files. In embodiments described herein, each key-value mapping (e.g., entry) in the index corresponds to a voronoi cell of a plurality of voronoi cells (e.g., described in detail below) of the index created for at least those input text files received by the system.

For example, prior to receiving the query request, each of the input text files (and, in some cases, one or more other text files) may have been (1) pre-processed, (2) converted to numerical representations, for example, vector embeddings, using embedding techniques, models, and/or encoders (e.g., a trained neural network encoder model), (3) compared against vector embeddings of the other input text files, and (4) organized in a low-dimensional space of an index based on the comparison. The comparison is used to determine a relatedness and/or similarity of each vector embedding to other vector embeddings which make up the input text files. In certain aspects, the comparison is performed by determining a distance metric between two vector embeddings. The distance metric may be calculated, for example, as a Euclidean distance, where a Euclidean distance is the length of a segment connecting (e.g., a straight line distance between) two points in either a plane or in a multi-dimensional space, or as cosine similarity metric. A small distance metric calculated between two vector embeddings may indicate that the embeddings are likely related, and thus these vector embeddings may be placed closer together in the index. Alternatively, a large distance metric calculated between two vector embeddings may indicate that the embeddings are likely not related, and thus these vector embeddings may be placed further apart in the index.

After organizing all vector embeddings related to the input text files (and in some cases, one or more other text files) in the index, the index is partitioned into a plurality of voronoi cells. Each voronoi cell corresponds to a region of the low dimensional space that contains vector embeddings closer (e.g., based on a distance metric) to a centroid of the respective voronoi cell than a centroid of another voronoi cell. In other words, each vector embedding is assigned to a voronoi cell whose centroid is closest to the respective vector embedding. As such, similar vector embeddings from a same text file and/or different text files may belong to a same voronoi cell. In certain aspects, the closeness of vector embeddings to centroids of the different Voronoi cells is determined by calculating the Euclidean distance between each vector embedding in the index and the set of centroid points.

Index entries, or key-value mappings, are created from these voronoi cells. In particular, as described above, each key of a respective key-value mapping created identifies a voronoi cell of the index, and each value of a respective key-value mapping created identifies vector embeddings belonging to the corresponding voronoi cell.

Instead of comparing vector embeddings for a received user query against every embedding in each document provided to the LLM-based system, as done in conventional RAG systems as described above, the LLM-based system determines a subset (e.g., less than all) of vector embeddings associated with these documents to use in the comparison by identifying a voronoi cell to which an embedding of the query belongs, as described further below. Vector embeddings belonging to the corresponding voronoi cell are then identified (e.g., using the key associated with the voronoi cell to search the key-value mappings of the index) and compared against vector embeddings of the query embedding to determine one or closest vector embeddings. This is referred to as a similarity search. Specifically, a vector similarity search (or similarity search for embeddings) may find the top K most similar vector embeddings in the identified voronoi cell to the query embedding. The closet vector embeddings are used to generate textual output in response to the received query.

The LLM-based system described herein, which leverages a pre-created index (e.g., associated with one or more text files) when performing a similarity search for RAG, provides significant technical advantages over conventional solutions. In particular, the LLM-based system described herein overcomes the aforementioned technical problems and provides the beneficial technical effect of reduced search latency, thereby dramatically accelerating query response times, particularly for large datasets (e.g., having a large number of vector embeddings for comparison). Specifically, because the pre-created index helps to efficiently organize a large number of vector embeddings for text file(s) into a plurality of voronoi cells, vector embeddings belonging to less than all of the voronoi cells of the index may need to be searched when receiving a query associated with the text file(s), thereby reducing time and/or resources previously needed to perform these additional searches (which may have been wasteful, in some cases, due to their "un-relatedness" to vector embeddings of the received query) and thus generate a query response. Reducing the search scope improves query response time, and thus overall performance of the LLM-based system. Further, reducing the search space, helps to ensure that a number of tokens that the LLM needs to process to produce a query response is below a token limit assigned to the LLM, while also removing the need for additional infrastructure to achieve this result (e.g., unlike MapReduce techniques, described above).

Example Large Language Model-Based Information Retrieval System for Large Datasets FIG. 1 illustrates an example LLM-based IR system 100 (simply referred to herein as "system 100") configured to perform RAG using an index partitioned into a plurality of voronoi cells. In certain aspects, RAG is performed by system 100 to generate textual output in response to a query received by system 100, where the query is associated with a plurality of input text files for which an index was previously created. To perform RAG using an index and thus generate textual output 118 in response to a received query (simply "query 112"), system 100 includes an LLM 102 having an index retrieval component 120, a query preprocessing component 122, a query embedding component 124, a voronoi cell determination component 126, a vector embeddings retrieval component 128, a similarity search component 130, and a candidate answer generation and scoring component 132.

System 100 is prompted to generate textual output 118 based on receiving a plurality of input text files 110 and a query 112. In certain aspects, input text files 110 are provided to system 100 by a user 108 uploading input text files 110 via an interface of LLM 102. Similarly, in certain aspects, query 112 is received by system 100 based on user 108 submitting query 112 via the interface of LLM 102.

As an illustrative example, input text files 110 received by LLM 102 may include multiple text files containing information about projected financial data for an organization in the year 2024. In other words, input text files 110 are generated specifically for the organization and may contain information that is not publicly available (for training off-the-shelf LLMs). Query 112 (e.g., received by LLM 102 in addition to input text files 110) may include a question of "what is the budget for 2024?" In other words, a user 108 who provides both input text files 110 and query 112 may be seeking the assistance of system 100 in determining the budget for 2024 based on information included in, at least, input text files 110.

Index retrieval component 120 of LLM 102 obtains an index 106 (or multiple indices 106) associated with the plurality of input text files 110 to process query 112. Specifically, a plurality of indices 106 may have been previously created for vector embeddings 116 of a plurality of text files 114. These pre-created indices 106, text files 114, and their corresponding vector embeddings 116 (e.g., low-dimensional representations) may be stored in memory 104 as shown in FIG. 1, or local storage(s) housed in, or directly attached to LLM 102. Storing pre-created indices 106, text files 114, and their corresponding vector embeddings 116 in memory 104 helps to reduce the amount of time to access pre-created indices 106, text files 114, and their corresponding vector embeddings 116 when a query 112 is received, than when pre-created indices 106, text files 114, and their corresponding vector embeddings 116 are maintained in storage.

In certain aspects, index retrieval component 120 of LLM 102 obtains index 106 via a LangChain framework. LangChain is a tool used to work with LLMs. LangChain enables the pre-processing of text files 114 by breaking them into chunks, embedding them in a vector space (e.g., creating vector embeddings 116), and creating an index 106 for the vector embeddings 116. The LangChain framework also enable components of LLM to obtain indices 106 created by text files 114 and their corresponding vector embeddings 116.

An index 106 obtained by index retrieval component 120 is a special data structure built on top of vector embeddings 116 generated for text files 114 (e.g., including at least input text files 110) associated with the index 106. In certain aspects, index 106 is an inverted index structure, which is a data structure storing a mapping from content, such as words, numbers, vector embeddings 116, etc., to its locations. For example, index 106 obtained by index retrieval component 120 includes a plurality of key-value mappings, where each key-value mapping includes a key and a corresponding value. Each key of a respective key-value mapping may identify a voronoi cell created for index 106, and each value of a respective key-value mapping may identify vector embeddings 116 of text files 114 associated with the particular voronoi cell associated with the corresponding key.

Figure 2A:
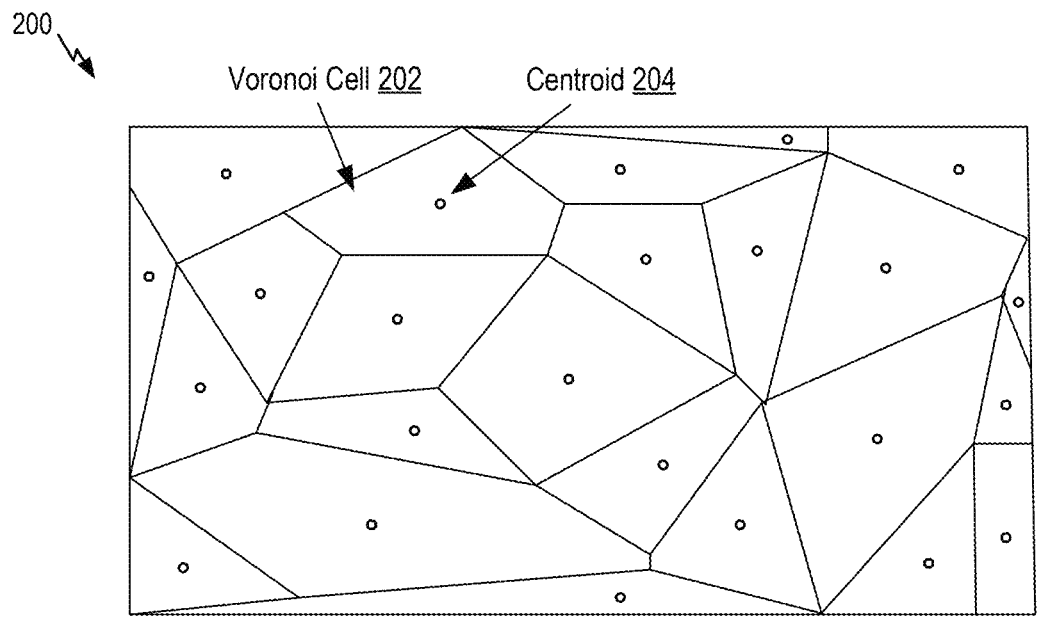
FIG. 2A depicts example index partitioned into a plurality of voronoi cells.
Figure 2B:
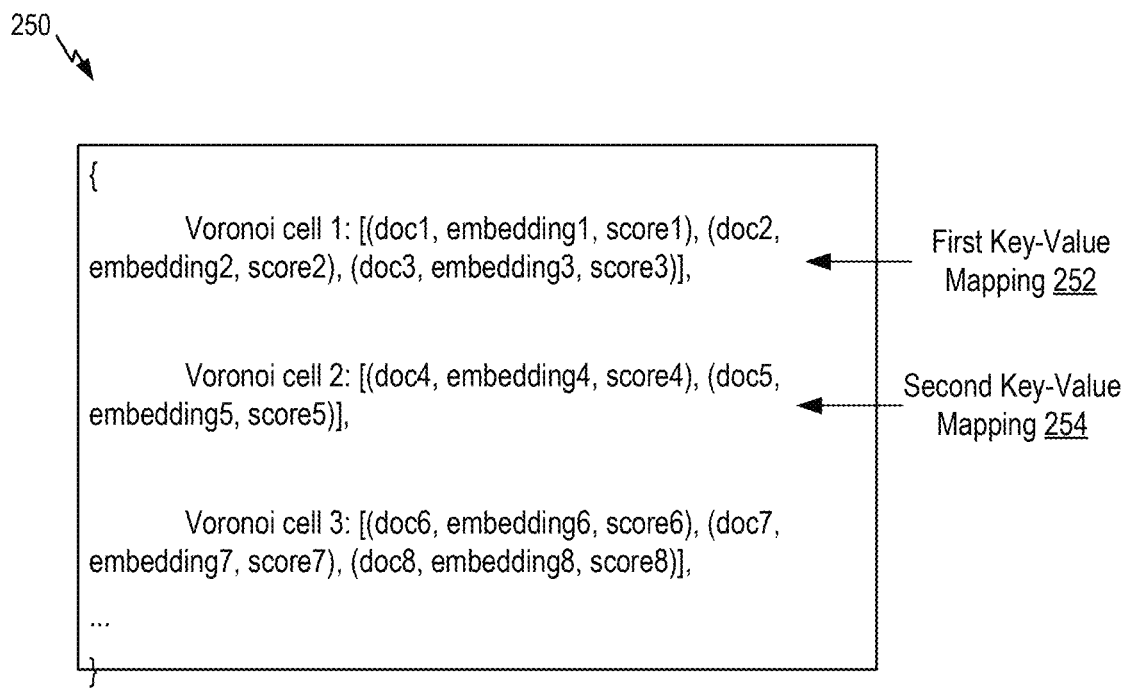
FIG. 2B depicts example key-value mappings associated with the plurality of voronoi cells depicted in FIG. 2A.

FIG. 2A depicts an example index 200 partitioned into a plurality of voronoi cells. FIG. 2B depicts example key-value mappings 250 associated with the plurality of voronoi cells depicted in FIG. 2A. Example index 200, with its corresponding key-value mappings, is an example of index 106 obtained by index retrieval component 120 in FIG. 1.

Although not shown in detail, example index 200 includes multiple vector embeddings associated with multiple text files. For example, example index 200 may include vector embeddings representing text in 500 pre-processed documents. Example index 200 organizes these vector embeddings based on a distance metric. For example, a distance metric, such as a Euclidean distance, cosine similarity, and/or the like, may be calculated between each pair of vector embeddings in example index 200. A smaller distance metric calculated between a pair of vector embeddings indicates a greater similarity/relatedness between these vector embeddings, while the opposite is true where a large distance metric is calculated. Vector embeddings in example index 200 are organized such that vector embeddings with a smaller calculated distance metric may be placed closer together in example index 200 than vector embeddings with a larger calculated distance metric. As such, more similar vector embeddings are placed in similar regions within example index 200.

Further, example index 200 is partitioned in a plurality of voronoi cells 202. A voronoi cell 202 is a polygonal region in example index 200 containing a set of vector embeddings (e.g., one or more vector embeddings in example index 200, but less than all vector embeddings). Vector embeddings belonging to a particular voronoi cell 202 are vector embeddings closer (e.g., based on a distance metric) to a centroid 204 of the respective voronoi cell 202 than a centroid 204 of another voronoi cell 202.

The size of each voronoi cell 202 in example index 200 may be the same or different. The size of each voronoi cell 202 depends on the distribution of the vector embeddings in example index 200 and the location of each of the centroids 204. The voronoi cells 202 are (approximately) equal in size and shape in cases where, for example, the vector embeddings in example index 200 are evenly distributed. However, in other cases, voronoi cells 202 may be irregularly shaped and/or vary widely in size, such as depicted in example index 200.

Each voronoi cell 202 is associated with a single key-value mapping (e.g., entry) of example index 200. For example, where 100 voronoi cells 202 make up example index 200, then 200 key-value mappings exist. Each key-value mapping has a key identifying a voronoi cell 202 of example index 200. Further, each key-value mapping has a value identifying vector embeddings associated a voronoi cell referenced by a key of the key-value mapping.

For example, FIG. 2B depicts three key-value mappings in example index 200. A first key-value mapping 252 is associated with voronoi cell 1 in example index 200. In particular, first key-value mapping 252 has a key identifying 'Voronoi cell 1" and a value identifying that "embedding1" from "doc1," "embedding2" from "doc2," and "embedding3" from "doc3" all belong to "Voronoi cell 1." Similarly, a second key-value mapping 254 is associated with voronoi cell 2 in example index 200. In particular, second key-value mapping 254 has a key identifying 'Voronoi cell 2" and a value identifying that "embedding4" from "doc4" and "embedding5" from "doc5" belong to "Voronoi cell 2."

In some cases, as shown in FIG. 2B, each value of each key-value mapping 250 further includes an LLM score. The LLM score is an estimate of the probability of a sequence of words given one or more preceding words as context. In other words, the LLM score may be calculated as the probability (P) assigned to a word $w\_i$ given preceding words $w\_1$ to $w\_(i-1)$ (e.g., $P\_(w\_i|w\_1, w\_2, \ldots, w\_(i-1))$). For example, "doc1" (e.g., an input text file) may contain the sentence "The capital of France is Paris. Paris is always a good idea." The LLM score calculated for the probability of "Paris" may be based on the context of "capital France," for example, after removing stop words from the sentence. This LLM score is stored in the index. Common words in queries that carry little, or no, meaningful information are referred to as stop words. For example, stop words may include words such as "is," "it," "a," "are," etc.

As described in detail below, key-value mappings of an index obtained by LLM 102 in FIG. 1, such as key-value mappings 250 in example index 200 of FIG. 2, are used to identify documents and vector embeddings that are to be compared against vector embeddings generated for query 112. Identifying vector embeddings belonging to one, or a few, voronoi cells (rather than all vector embeddings of the index) helps to reduce a search space for performing a similarity search, which improves search speed, reduces latency, and reduces processing power. Further, comparing vector embeddings belonging to one, or a few, voronoi cells (rather than all vector embeddings of the index) helps to reduce processing time and resources used to generate textual output in response to query 112

Returning to FIG. 1, after index retrieval component 120 obtains index 106 associated with at least input text files 110 (e.g., provided to LLM 102 by user 108), query pre-processing component 122 of LLM 102 performs pre-processing on query 112. Pre-processing includes (1) dividing text of query 112 into a plurality of chunks (e.g., referred to as "tokenization") and/or (2) removing one or more of the plurality of chunks of query 112 associated with one or more stop words to generate a pre-processed query. Tokenization and stop word removal are two beneficial steps in pre-processing text data for NLP tasks. These steps help to prepare the text data for further analysis.

For the above example, pre-processing performed by query pre-processing component 122 may include separating query "what is the budget for 2024?" into seven chunks including "what," "is," "the," "budget," "for," "2024," "?," and " " (a space). Further pre-processing may remove stop words such that the resulting pre-processed query is "budget 2024."

Query embedding component 124 then embeds the pre-processed query to create a query embedding. As described above, query embedding is the numerical representation of words to capture their meanings, the varied contexts they are used in, and their semantic relationship with each other, thereby equipping computers and/or models to understand them. The query embedding created by query embedding component 124 may have a lower dimensionality than the pre-processed query and the query before processing. Having lower dimensional data helps to overcome the "Curse of Dimensionality", which leads to faster query times given searching is not being done in a higher dimensional space. Specifically, the Curse of Dimensionality refers to the difficulty encountered when trying to analyze high-dimensional data. High-dimensional data may be characterized by a large number of features and a small number of observations. At its core, the Curse of Dimensionality occurs when the number of dimensions exceeds the number of observations in a given data set. This is because in higher dimensional spaces, points are much more sparsely distributed than in lower dimensional spaces. The Curse of Dimensionality can make it difficult to find meaningful patterns and/or accurately predict trends and/or outcomes because there aren't enough observations to adequately capture complex dynamics in high-dimensional datasets.

Voronoi cell determination component 126 uses the query embedding (e.g., created via query embedding component 124) and index 106 (e.g., obtained via index retrieval component 120) to identify a voronoi cell of index 106 corresponding to the query embedding. More specifically, voronoi cell determination component 126 identifies a first key-value mapping for index 106 (e.g., key-value mappings 250 in FIG. 2B) comprising a first key and a first value, where the first key of the key-value mapping is associated with a voronoi cell in index 106 that corresponds to the query embedding.

As an illustrative example, a received query stating "What is the capital of France?" may be (1) pre-processed to remove stop words (e.g., having "capital France" remaining) and (2) used to create a low-dimensional embedding for the query. A distance metric, such as a Euclidean distance, cosine similarity, and/or the like, may be calculated between the query embedding and the centroid of each voronoi cell in index 106. A smaller distance metric calculated between the query embedding and a centroid of a voronoi cell may indicate a greater similarity/relatedness between the query embedding and the voronoi cell. A voronoi cell (e.g., such as Voronoi cell 1 in FIG. 2B) having a greatest similarity (or increased similarity) to the query embedding may be identified as the voronoi cell of the index corresponding to the query embedding (e.g., identified by voronoi cell determination component 126).

For the above example, the voronoi cell determination component 126 may determine that the query embedding for the pre-processed query "budget 2024" corresponds to a first voronoi cell associated with a first key-value mapping. The first key-value mapping may have (1) a key identifying the first voronoi cell and (2) a value identifying that a first vector embedding 116(1) associated with a first text file 114(1), a second vector embedding 116(2) associated with a second text file 114(2), and a third vector embedding 116(3) associated with a third text file 114(3) belong to the first voronoi cell in index 106 (e.g., similar to first key-value mapping 252 in FIG. 2B).

Vector embeddings retrieval component 128 uses the value of the key-value mapping associated with the identified voronoi cell (e.g., corresponding to the query embedding) to determine which vector embeddings 116 and text files 114 are to be used for a similarity search. Vector embeddings retrieval component 128 obtains these vector embeddings 116 and provide them to LLM 102. In this example, vector embeddings 116 obtained by vector embeddings retrieval component 128 are the only vector embeddings 116 of index 106 that are used by LLM 102.

In certain aspects, vector embeddings retrieval component 128 of LLM 102 is configured to obtain the identified vector embeddings 116 via the LangChain framework.

Similarity search component 130 then uses the obtained vector embeddings 116 when performing a similarity search. For example, similarity search component 130 computes the similarity of each of the retrieved vector embeddings 116 to the query embedding (e.g., created by query embedding component 124). Comparing the query embedding to the obtained vector embeddings 116 is performed to determine one or more closest vector embeddings 116 (e.g., to the query embedding).

For the previous example, similarity search component 130 may (1) compare the first vector embedding 116(1) associated with first text file 114(1) to the query embedding, (2) compare the second vector embedding 116(2) associated with second text file 114(2) with the query embedding, and (3) compare the third vector embedding 116(3) associated with third text file 114(3) to the query embedding. Based on this comparison, similarity search component 130 determines the closest vector embedding(s) 116 to the query embedding.

Candidate answer generation and scoring component 132 then generates one or more candidate answers to query 112 based on the closest vector embedding(s) 116 and score each of the candidate answers generated by component 132. In certain aspects, candidate answer generation and scoring component 132 ranks the candidate answers based on their likelihood of being a correct response to query 112. The top-ranked answer may be retrieved and provided as textual output 118 to user 108.

In certain aspects, candidate answer generation and scoring component 132 scores each of the candidate answers using a language model that estimates the probability of a sequence of words given a context. As described above, the context is typically a sequence of words that precede the target sequence. The LLM score is computed as the log probability of the target sequence given the context. A high LLM score indicates that the target sequence (e.g., candidate answer) is likely to be correct given the context, and the opposite may be true where a low LLM score is calculated.

For the above example, candidate answer generation and scoring component 132 may generate multiple candidate answers to the pre-processed query "budget 2024." A top-ranked candidate answer may include textual output indicating that the organization's projected budget for 2024 is approximately $1 million dollars when the actual projected budget is $995,000. A low-ranked candidate answer may include textual output indicate that the organization's projected budget for 2024 is approximately $500,000 when the actual projected budget is $995,000. The top-ranked candidate answer generated by LLM 102 may be provided to user 108 as textual output 118. After providing textual output 118 to user 108, processing of query 112 is complete.

Example Aspects Related to Merging Indices

In some cases, to improve the accuracy and efficiency of vector embedding retrieval (e.g., by vector embeddings retrieval component 128 in FIG. 1), two or more previously created indices (e.g., two or more indices 106 stored in memory 104 in FIG. 1) are merged.

Figure 3:
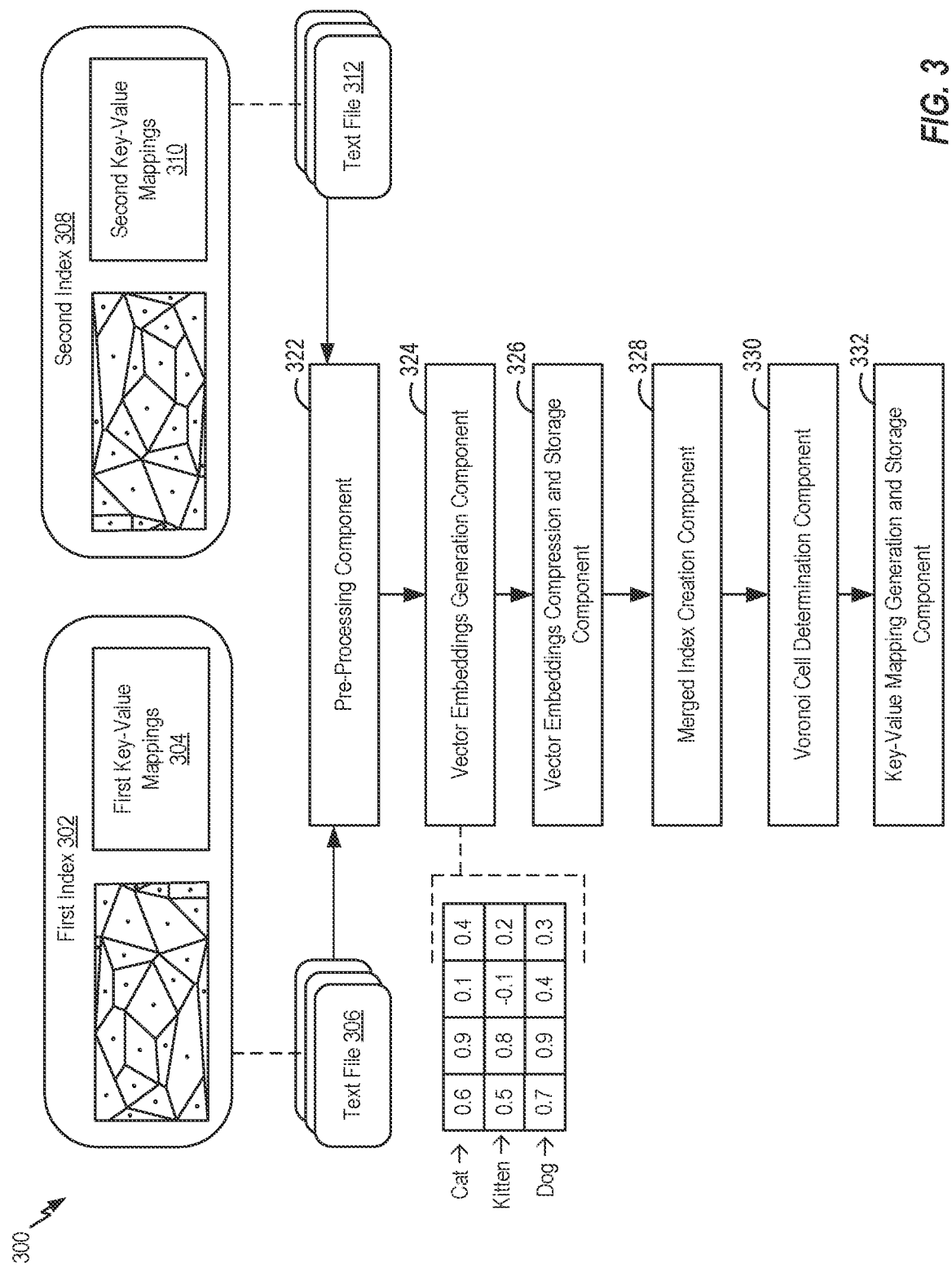
FIG. 3 depicts an example information retrieval system configured to merge indices for use in retrieval augmented generation tasks.

FIG. 3 depicts an example LLM-based IR system 300 configured to merge indices for use in RAG tasks. Although FIG. 3 depicts the merging of two indices, namely a first index 302 and second index 308, similar steps described with respect to FIG. 3 may also be used to merge more than two indices.

First index 302 is a first data structure associated with a first plurality of text files 306 (e.g., text files 1-500). First index 302 includes first key-value mappings 304. Each first key of a respective first key-value mapping 304 identifies a voronoi cell of first index 302. Further, each first value of a respective first key-value mapping 304 identifies first vector embeddings of text files 306 (e.g., text files 1-500) associated with a voronoi cell of first index 302 which corresponds to the first key of the respective first key-value mapping 304.

Second index 308 is a second data structure associated with a second plurality of text files 312 (e.g., text files 501-1,000). Second index 308 includes second key-value mappings 310. Each second key of a respective second key-value mapping 310 identifies a voronoi cell of second index 308. Further, each second value of a respective second key-value mapping 310 identifies second vector embeddings of text files 312 (e.g., text files 1-500) associated with a voronoi cell of second index 308 which corresponds to the second key of the respective second key-value mapping 310.

Merging first index 302 and second index 308 requires that first index 302 and second index 308 have a consistent structure. Because first index 302 and second index 308 may not have a consistent structure, steps performed by a pre-processing component 322, a vector embeddings generation component 324, and/or a vector embeddings compression and storage component 326 may be performed prior to creation of the merged index by a merged index creation component 328, a voronoi cell determination component 330, and a key-value mapping generation and storage component 332.

For example, pre-processing component 322 processes the first plurality of text files 306 (e.g., previously associated with first index 302) and the second plurality of text files 312 (e.g., previously associated with second index 308) into a plurality of chunks (e.g., tokens). Further, in certain aspects, pre-processing component 322 removes one or more of the chunks created for the first plurality of text files 306 and the second plurality of text files text files 312 that are associated with stop words. As such, pre-processing component 322 may be similar to query pre-processing component 122 described in FIG. 1.

Vector embeddings generation component 324 then embeds each of the remaining chunks created for the first plurality of text files 306 and the second plurality of text files text files 312 with a trained encoder model to produce third vector embeddings. Example third vector embeddings are illustrated in FIG. 3; however, many other vector embeddings with various dimensionality may be generated by vector embeddings generation component 324. For example, the word "cat" may have been found in one of the first plurality of text files 306. The word "cat" may correspond to a single chunk (e.g., single token). In this example, the vector embedding created for the word "cat" indicates that "cat" in the dimension of an animal (e.g., second column) is 0.9, while "cat" in the dimension of a predator (e.g., fourth column) is 0.4.

Vector embeddings compression and storage component 326 stores third vector embeddings in memory (e.g., such as memory 104 in FIG. 1) and/or storage. In certain aspects, vector embeddings compression and storage component 325 additionally compresses the third vector embeddings prior to storage, and store the compressed third vector embeddings in memory and/or storage. Compression may be performed where available memory and/or storage is limited for storing the third vector embeddings.

Merged index creation component 328 generates the merged index based on the third vector embeddings and a distance metric. For example, third vector embeddings that make up the merged index may be organized based on the distance metric a distance metric, such as a Euclidean distance, cosine similarity, and/or the like, may be calculated between each pair of third vector embeddings generated by vector embeddings generation component 324. A smaller distance metric calculated between a pair of third vector embeddings may indicate a greater similarity/relatedness between these vector embeddings, while the opposite is true where a large distance metric is calculated. The third vector embeddings may be organized such that third vector embeddings with a smaller calculated distance metric may be placed closer together in the merged index, created by merged index creation component 328, than third vector embeddings with a larger calculated distance metric. Instead of having two indices each corresponding to a unique set of 500 document, a single merged index is now created that corresponds to all 1,000 documents.

Voronoi cell determination component 330 partitions the merged index into a plurality of third voronoi cells based on the third vector embeddings. Key-value mapping generation and storage component 332 is configured to generate key-value mappings (e.g., such as key-value mappings 250 of FIG. 2B) for the merged index.

Merging the indices provides a technical benefit in that merging two indices into a single index improves the accuracy and/or efficiency of retrieval when processing a query.

For example, in FIG. 1, LLM 102 may receive two input text files 110 and query 112, where each of the two input text files 110 are associated with different indices 106 (e.g., a first input text file 110(1) is associated with a first index 106(1) and a second input text file 110(2) is associated with a second index 106(2)). Instead of identifying a voronoi cell in each index 106 corresponding to query 112 (e.g., more specifically, a low-dimensional query embedding created based on query 112), as well as performing a similarity search on vector embeddings 116 of each voronoi cell to determine the closest vector embedding(s) 116 to query 112, the indices 106 may first be merged such that vector embeddings 116 from a single voronoi cell, which may correspond to both the first input text file 110(1) and the second input text file 110(2), are searched. This may help improve the accuracy and/or efficiency in generating textual output 118 in response to query 112. Further, merging data belonging to multiple indices 106 allows for more than one document to be compared, for use cases where the documents are inter-related.

Example Methods

Figure 4:
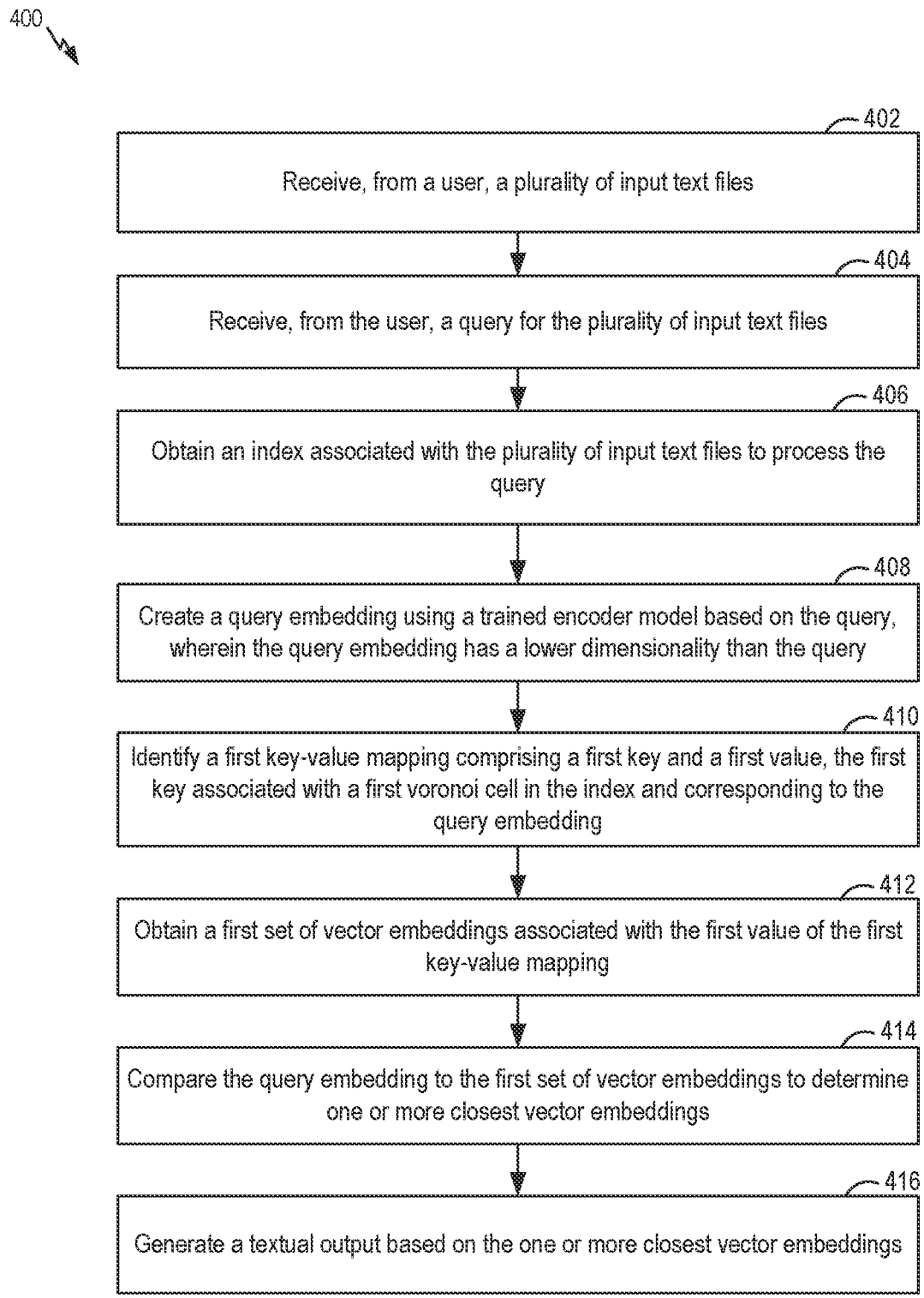
FIG. 4 depicts an example method performed by a large language model of an information retrieval system.

FIG. 4 illustrates an example method 400 related to information retrieval for large datasets. Method 400 may be performed by one or more processor(s) of a computing device, such as processor(s) 602 of processing system 600 described below with respect FIG. 6. In some cases, method 400 is performed by an LLM of an IR system.

Method 400 begins, at step 402, with receiving, from a user, a plurality of input text files.

Method 400 proceeds, at step 404, with receiving, from the user, a query for the plurality of input text files. In certain aspects, the plurality of input text files and the query are received (e.g., at steps 402 and step 404, respectively) via an interface of an LLM.

Method 400 proceeds, at step 406, with obtaining an index associated with the plurality of input text files to process the query. In certain aspects, the index includes a plurality of key-value mappings. Each key of a respective key-value mapping of the plurality of key-value mappings may identify a voronoi cell of the index, and each value of a respective key-value mapping of the plurality of key-value mappings may identify vector embeddings associated with a plurality of text files associated with a voronoi cell of the index. In certain aspects, the index associated with the plurality of input text files is obtained via a LangChain framework.

Method 400 proceeds, at step 408, with creating a query embedding using a trained encoder model based on the query, wherein the query embedding has a lower dimensionality than the query. As described above, having lower dimensional data helps to overcome the "Curse of Dimensionality", which may lead to faster query response times.

Method 400 proceeds, at step 410, with identifying a first key-value mapping comprising a first key and a first value. The first key may be associated with a first voronoi cell in the index and correspond to the query embedding;

Method 400 proceeds, at step 412, with obtaining a first set of vector embeddings associated with the first value of the first key-value mapping. As described above, identifying vector embeddings belonging to one, or a few, voronoi cells (rather than all vector embeddings of the index) helps to reduce a search space for performing a similarity search, which improves search speed, reduces latency, and reduces processing power.

Method 400 proceeds, at step 414, with comparing the query embedding to the first set of vector embeddings to determine one or more closest vector embeddings. In certain aspects, comparing the query embedding to the first set of vector embeddings includes calculating a distance metric between the query embedding to each vector embedding in the first set of vector embeddings. The distance metric may be one of a Euclidean distance, or a cosine similarity.

Method 400 proceeds, at step 416, with generating a textual output based on the one or more closest vector embeddings. As described above, comparing vector embeddings belonging to one, or a few, voronoi cells (rather than all vector embeddings of the index) helps to reduce processing time and resources used to generate textual output in response to query 112.

In certain aspects, method 400 further includes obtaining a second set of vector embeddings associated with a second value of a second key-value mapping, where the second key-value mapping comprising a second key associated with a second voronoi cell neighboring the first voronoi cell, and comparing the query embedding to the second set of vector embeddings to determine the one or more closest vector embeddings.

In certain aspects, method 400 further includes, prior to creating the query embedding (e.g., at step 408), processing text of the query into a plurality of chunks and removing one or more of the plurality of chunks of the query associated with one or more stop words to generate a pre-processed query, wherein the pre-processed query is embedded to create the query embedding.

In certain aspects, the query received at step 402 is a request to summarize text of the input text files, and the textual output generated at step 416 includes a summary of the input text files.

In certain aspects, the query received at step 402 is a request related to tax preparation, and the textual output generated at step 416 is at least one of a tax recommendation, tax help, a tax submission, or tax preparation instructions.

Note that FIG. 4 is just one example of a method, and other methods including fewer, additional, or alternative steps are possible consistent with this disclosure.

Figure 5:
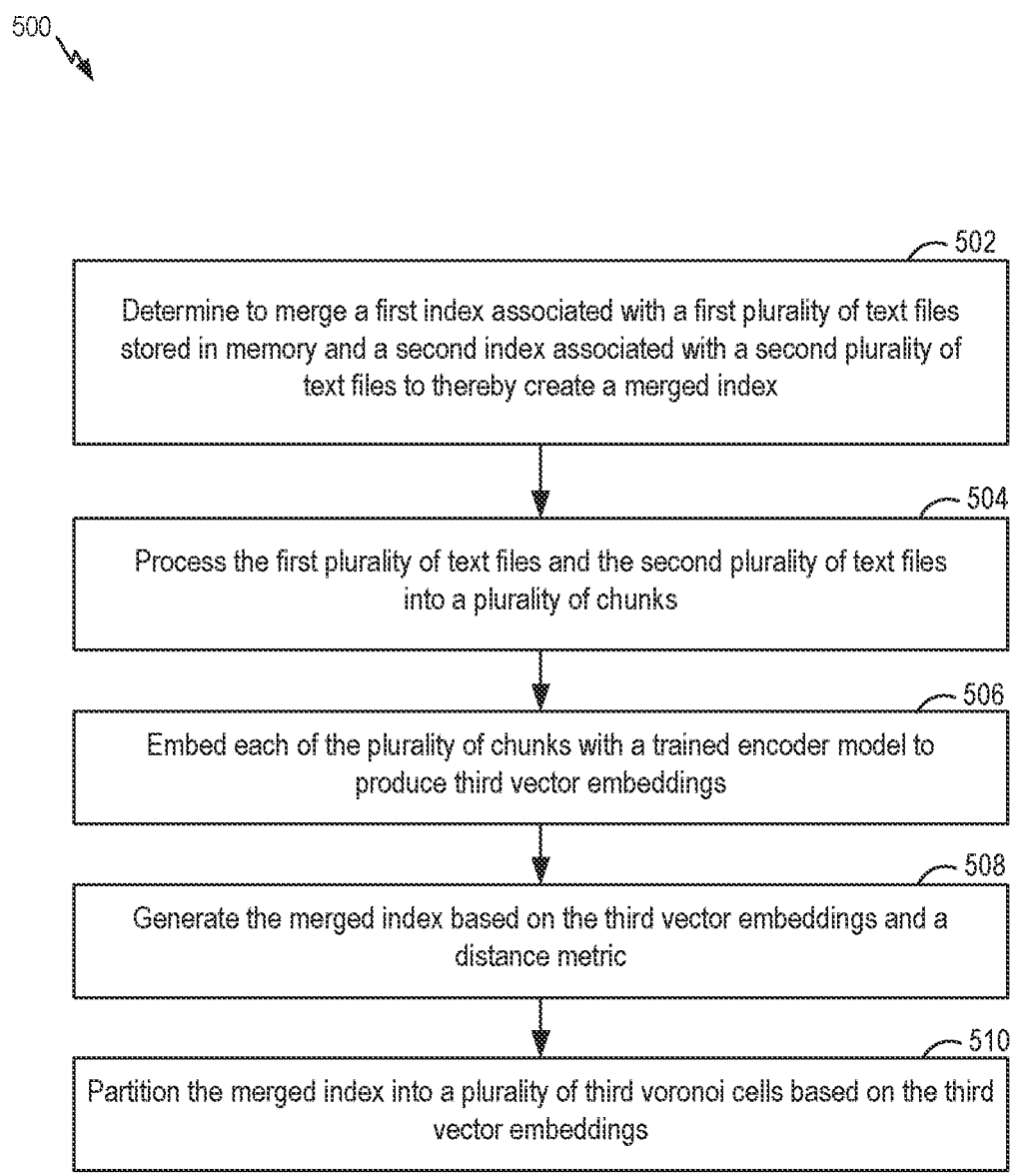
FIG. 5 depicts an example method for merging indices.

FIG. 5 illustrates an example method 500 related to the merging of indices for information retrieval tasks. Method 500 may be performed by one or more processor(s) of a computing device, such as processor(s) 602 of processing system 600 described below with respect FIG. 6.

Method 500 begins, at step 502, with determining to merge a first index associated with a first plurality of text files stored in memory and a second index associated with a second plurality of text files to thereby create a merged index. The first index may include a plurality of first key-value mappings, each first key of a respective first key-value mapping of the plurality of first key-value mappings identifying a first voronoi cell of the first index, and each first value of a respective first key-value mapping of the plurality of first key-value mappings identifying first vector embeddings associated with the first plurality of text files associated with a first voronoi cell of the first index. The second index may include a plurality of second key-value mappings, each second key of a respective second key-value mapping of the plurality of second key-value mappings identifying a second voronoi cell of the second index, and each second value of a respective second key-value mapping of the plurality of second key-value mappings identifying second vector embeddings associated with the second plurality of text files associated with a second voronoi cell of the second index.

Method 500 proceeds, at step 504, with processing the first plurality of text files and the second plurality of text files into a plurality of chunks.

Method 500 proceeds, at step 506, with embedding each of the plurality of chunks with a trained encoder model to produce third vector embeddings.

Method 500 proceeds, at step 508, with generating the merged index based on the third vector embeddings and a distance metric.

Method 500 proceeds, at step 510, with partitioning the merged index into a plurality of third voronoi cells based on the third vector embeddings.

In certain aspects, method 500 further includes compressing the third vector embeddings prior to generating the merged index.

In certain aspects, method 500 further includes storing the merged index partitioned into the plurality of third voronoi cells as a plurality of third key-value mappings. Each third key of a respective third key-value mapping of the plurality of third key-value mappings may identify a third voronoi cell of the plurality of third voronoi cells, and each third value of a respective third key-value mapping of the plurality of third key-value mappings may identify third vector embeddings associated with the first plurality of text files and the second plurality of text files associated with a third voronoi cell of the plurality of third voronoi cells. The distance metric may be one of a Euclidean distance, or a cosine similarity.

Note that FIG. 5 is just one example of a method, and other methods including fewer, additional, or alternative steps are possible consistent with this disclosure.

Example Processing System

Figure 6:
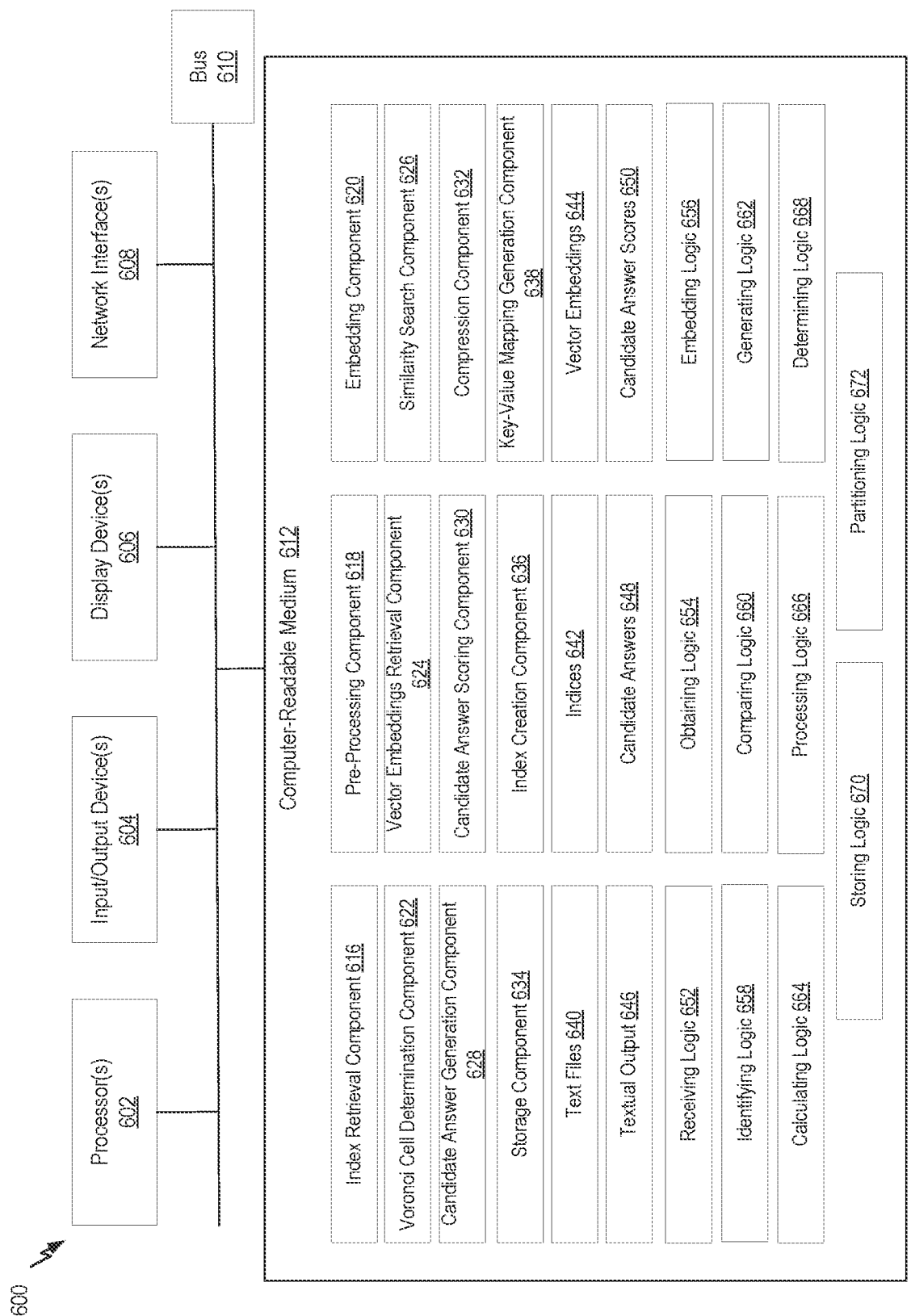
FIG. 6 depicts an example processing system with which aspects of the present disclosure can be performed.

FIG. 6 depicts an example processing system 600 configured to perform various aspects described herein, including, for example, method 400 as described above with respect to FIG. 4 and method 500 as described above with respect to FIG. 5.

Processing system 600 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, one or more network interfaces 608 through which processing system 600 is connected to one or more networks (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain embodiments, processor(s) 602 are representative of a one or more central processing units (CPUs), graphics processing unit (GPUs), tensor processing unit (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 606 may be configured to display a graphical user interface.

Network interface(s) 608 provide processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random access memory (RAM), or a nonvolatile memory, such as nonvolatile random access memory (NVRAM), or the like. In this example, computer-readable medium 612 includes index retrieval component 616, pre-processing component 618, embedding component 620, voronoi cell determination component 622, vector embeddings retrieval component 624, similarity search component 626, candidate answer generation component 628, candidate answer scoring component 630, compression component 632, storage component 634, index creation component 636, key-value mapping generation component 638, text files 640, indices 642, vector embeddings 644, textual output 646, candidate answers 648, candidate answer scores 650, receiving logic 652, obtaining logic 654, embedding logic 656, identifying logic 658, comparing logic 660, generating logic 662, calculating logic 664, processing logic 666, determining logic 668, storing logic 670, and partitioning logic 672.

In certain aspects, index retrieval component 616 is configured to obtain an index (or multiple indices) associated with the plurality of input text files. In certain aspects, index retrieval component 616 is an example of index retrieval component 120 in FIG. 1.

In certain aspects, pre-processing component 618 is configured to perform pre-processing on query(ies) and/or text file(s). In certain aspects, pre-processing component 618 is an example of query pre-processing component 122 in FIG. 1. In certain aspects, pre-processing component 618 is an example of pre-processing component 322 in FIG. 3.

In certain aspects, embedding component 620 is configured to embed a pre-processed query to create a query embedding. In certain aspects, embedding component 620 is configured to generate one or more vector embeddings. In certain aspects, embedding component 620 is an example of query embedding component 124 in FIG. 1. In certain aspects, embedding component 620 is an example of vector embeddings generation component 324 in FIG. 3.

In certain aspects, voronoi cell determination component 622 is configured to use a query embedding and an index to identify a voronoi cell of the index corresponding to the query embedding. In certain aspects, voronoi cell determination component 622 is configured to partition an index into a plurality of voronoi cells. In certain aspects, voronoi cell determination component 622 is an example of voronoi cell determination component 126 in FIG. 1. In certain aspects, voronoi cell determination component 622 is an example of voronoi cell determination component 330 in FIG. 3.

In certain aspects, vector embeddings retrieval component 624 is configured to obtain vector embeddings. In certain aspects, vector embeddings retrieval component 624 is an example of vector embeddings retrieval component 128 in FIG. 1.

In certain aspects, similarity search component 626 is configured to use vector embeddings to perform a similarity search. In certain aspects, similarity search component 626 is an example of similarity search component 130 in FIG. 1.

In certain aspects, candidate answer generation component 628 is configured to generate a plurality of candidate answers, as textual output, to a user-submitted query. In certain aspects, candidate answer generation component 628 is an example of candidate answer generation and scoring component 132 in FIG. 1.

In certain aspects, candidate answer scoring component 630 is configured to score a plurality of candidate answers, generated as output for a user-submitted query. In certain aspects, candidate answer scoring component 630 is an example of candidate answer generation and scoring component 132 in FIG. 1.

In certain aspects, compression component 632 is configured to compress vector embeddings prior to storage. In certain aspects, compression component 632 is an example of vector embeddings compression and storage component 326 in FIG. 3.

In certain aspects, storage component 634 is configured to store vector embeddings, text files, and/or indices. In certain aspects, storage component 634 is an example of vector embeddings compression and storage component 326 in FIG. 3.

In certain aspects, index creation component 636 is configured to create an index and/or a merged index. In certain aspects, index creation component 636 is an example of merged index creation component 328 in FIG. 3.

In certain aspects, key-value mapping generation component 638 is configured to generate a plurality of key-value mappings for an index. In certain aspects, key-value mapping generation component 638 is an example of key-value mapping generation and storage component 332 in FIG. 3.

In certain aspects, text files 640 are digital, non-executable files that contain letters, numbers, and/or symbols.

In certain aspects, indices 642 are special data structures built on top of vector embeddings.

In certain aspects, vector embeddings 644 are numerical representations of words or sentences, used in NLP to facilitate efficient analysis and manipulation of text data. In certain aspects, vector embeddings 644 are generated for text files and/or queries.

In certain aspects, textual output 646 includes information processed by and sent out from a computer and/or another electronic device in response to a query.

In certain aspects, candidate answers 648 include one or more answers to one or more queries.

In certain aspects, candidate answer scores 650 includes scores for one or more answers to one or more queries that are used to determine evaluate which answer to provide in response to a query.

In certain aspects, receiving logic 652 includes logic for receiving, from a user, a plurality of input text files. In certain aspects, receiving logic 652 includes logic for receiving, from the user, a query for the plurality of input text files.

In certain aspects, obtaining logic 654 includes logic for obtaining an index associated with the plurality of input text files to process the query. In certain aspects, obtaining logic 654 includes logic for obtaining a first set of vector embeddings associated with the first value of the first key-value mapping. In certain aspects, obtaining logic 654 includes logic for obtaining a second set of vector embeddings associated with a second value of a second key-value mapping, the second key-value mapping comprising a second key associated with a second voronoi cell neighboring the first voronoi cell.

In certain aspects, embedding logic 656 includes logic for creating a query embedding based on a query. In certain aspects, embedding logic 656 includes logic for embedding each of the plurality of chunks with a trained encoder model to produce third vector embeddings.

In certain aspects, identifying logic 658 includes logic for identifying a first key-value mapping comprising a first key and a first value, the first key associated with a first voronoi cell in the index and corresponding to the query embedding.

In certain aspects, comparing logic 660 includes logic for comparing the query embedding to the first set of vector embeddings to determine one or more closest vector embeddings. In certain aspects, comparing logic 660 includes logic for comparing the query embedding to the second set of vector embeddings to determine the one or more closest vector embeddings.

In certain aspects, generating logic 662 includes logic for generating a textual output based on the one or more closest vector embeddings. In certain aspects, generating logic 662 includes logic for generating the merged index based on the third vector embeddings and a distance metric.

In certain aspects, calculating logic 664 includes logic for calculating a distance metric between the query embedding to each vector embedding in the first set of vector embeddings.

In certain aspects, processing logic 666 includes logic for processing text of the query into a plurality of chunks. In certain aspects, processing logic 666 includes logic for removing one or more of the plurality of chunks of the query associated with one or more stop words to generate a pre-processed query, wherein the pre-processed query is embedded to create the query embedding. In certain aspects, processing logic 666 includes logic for processing the first plurality of text files and the second plurality of text files into a plurality of chunks.

In certain aspects, determining logic 668 includes logic for determining to merge a first index associated with a first plurality of text files stored in memory and a second index associated with a second plurality of text files to thereby create a merged index.

In certain aspects, storing logic 670 includes logic for storing one or more indices (e.g., including a merged index) in memory, in local storage, etc.

In certain aspects, partitioning logic 672 includes logic for partitioning the merged index into a plurality of third voronoi cells based on the third vector embeddings.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method comprising: receiving, from a user, a plurality of input text files; receiving, from the user, a query for the plurality of input text files; obtaining an index associated with the plurality of input text files to process the query, wherein: the index comprises a plurality of key-value mappings, each key of a respective key-value mapping of the plurality of key-value mappings identifying a voronoi cell of the index, and each value of a respective key-value mapping of the plurality of key-value mappings identifying vector embeddings associated with a plurality of text files associated with a voronoi cell of the index; creating a query embedding using a trained encoder model based on the query, wherein the query embedding has a lower dimensionality than the query; obtaining a first set of vector embeddings associated with the first value of the first key-value mapping; comparing the query embedding to the first set of vector embeddings to determine one or more closest vector embeddings; and generating a textual output based on the one or more closest vector embeddings.

Clause 2: The method of Clause 1, further comprising: obtaining a second set of vector embeddings associated with a second value of a second key-value mapping, the second key-value mapping comprising a second key associated with a second voronoi cell neighboring the first voronoi cell; and comparing the query embedding to the second set of vector embeddings to determine the one or more closest vector embeddings.

Clause 3: The method of any one of Clauses 1-2, wherein comparing the query embedding to the first set of vector embeddings comprises calculating a distance metric between the query embedding to each vector embedding in the first set of vector embeddings.

Clause 4: The method of Clause 3, wherein the distance metric comprises one of: a Euclidean distance, or a cosine similarity.

Clause 5: The method of any one of Clauses 1-4, wherein the plurality of input text files and the query are received via an interface of a large language model (LLM).

Clause 6: The method of any one of Clauses 1-5, wherein the index associated with the plurality of input text files is obtained via a LangChain framework.

Clause 7: The method of any one of Clauses 1-6, further comprising, prior to creating the query embedding: processing text of the query into a plurality of chunks; and removing one or more of the plurality of chunks of the query associated with one or more stop words to generate a pre-processed query, wherein the pre-processed query is embedded to create the query embedding.

Clause 8: The method of any one of Clauses 1-7, wherein: the query comprises a request to summarize text of the input text files, and the textual output comprises a summary of the input text files.

Clause 9: The method of any one of Clauses 1-8, wherein: the query comprises a request related to tax preparation, and the textual output comprises at least one of a tax recommendation, tax help, a tax submission, or tax preparation instructions.

Clause 10: A method comprising: determining to merge a first index associated with a first plurality of text files stored in memory and a second index associated with a second plurality of text files to thereby create a merged index, wherein: the first index comprises a plurality of first key-value mappings, each first key of a respective first key-value mapping of the plurality of first key-value mappings identifying a first voronoi cell of the first index, and each first value of a respective first key-value mapping of the plurality of first key-value mappings identifying first vector embeddings associated with the first plurality of text files associated with a first voronoi cell of the first index, and the second index comprises a plurality of second key-value mappings, each second key of a respective second key-value mapping of the plurality of second key-value mappings identifying a second voronoi cell of the second index, and each second value of a respective second key-value mapping of the plurality of second key-value mappings identifying second vector embeddings associated with the second plurality of text files associated with a second voronoi cell of the second index; processing the first plurality of text files and the second plurality of text files into a plurality of chunks; embedding each of the plurality of chunks with a trained encoder model to produce third vector embeddings; generating the merged index based on the third vector embeddings and a distance metric; and partitioning the merged index into a plurality of third voronoi cells based on the third vector embeddings.

Clause 11: The method of Clause 10, further comprising compressing the third vector embeddings prior to generating the merged index.

Clause 12: The method of any one of Clauses 10-11, further comprising: storing the merged index partitioned into the plurality of third voronoi cells as a plurality of third key-value mappings, each third key of a respective third key-value mapping of the plurality of third key-value mappings identifying a third voronoi cell of the plurality of third voronoi cells, and each third value of a respective third key-value mapping of the plurality of third key-value mappings identifying third vector embeddings associated with the first plurality of text files and the second plurality of text files associated with a third voronoi cell of the plurality of third voronoi cells.

Clause 13: The method of any one of Clauses 10-12, wherein the distance metric comprises one of: a Euclidean distance, or a cosine similarity.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving, from a user, a plurality of input text files;
   receiving, from the user, a query for the plurality of input text files;
   obtaining an index associated with the plurality of input text files to process the query, wherein:
      the index is partitioned into a plurality of voronoi cells,
      each voronoi cell of the plurality of voronoi cells being associated with a respective key-value mapping of a plurality of key-value mappings,
      each key of the respective key-value mapping identifying a respective voronoi cell of the plurality of voronoi cells, and
      each value of the respective key-value mapping identifying vector embeddings associated with a plurality of text files associated with the respective voronoi cell of the plurality of voronoi cells;
   creating a query embedding based on the query using a trained encoder model, wherein the query embedding has a lower dimensionality than the query;
   identifying a first key-value mapping comprising a first key and a first value, the first key associated with a first voronoi cell of the plurality of voronoi cells and corresponding to the query embedding;

obtaining a first set of vector embeddings associated with the first value of the first key-value mapping, the first set of vector embeddings being associated with the first voronoi cell;

comparing the query embedding to the first set of vector embeddings to determine one or more closest vector embeddings such that vector embeddings belonging to less than all of the plurality of voronoi cells are searched to generate a response to the query, thereby improving a query response time; and generating a textual output based on the one or more closest vector embeddings.

2. The method of claim 1, further comprising:

obtaining a second set of vector embeddings associated with a second value of a second key-value mapping, the second key-value mapping comprising a second key associated with a second voronoi cell neighboring the first voronoi cell; and comparing the query embedding to the second set of vector embeddings to determine the one or more closest vector embeddings.

3. The method of claim 1, wherein comparing the query embedding to the first set of vector embeddings comprises calculating a distance metric between the query embedding to each vector embedding in the first set of vector embeddings.

4. The method of claim 3, wherein the distance metric comprises one of:

an Euclidean distance, or a cosine similarity.

5. The method of claim 1, wherein the plurality of input text files and the query are received via an interface of a large language model (LLM).

6. The method of claim 1, wherein the index associated with the plurality of input text files is obtained via a LangChain framework.

7. The method of claim 1, further comprising, prior to creating the query embedding:

processing text of the query into a plurality of chunks; and removing one or more of the plurality of chunks of the query associated with one or more stop words to generate a pre-processed query, wherein the pre-processed query is embedded to create the query embedding.

8. The method of claim 1, wherein:

the query comprises a request to summarize text of the plurality of input text files, and the textual output comprises a summary of the plurality of input text files.

9. The method of claim 1, wherein:

the query comprises a request related to tax preparation, and the textual output comprises at least one of a tax recommendation, tax help, a tax submission, or tax preparation instructions.

10. A method comprising:

determining to merge a first index associated with a first plurality of text files stored in memory and a second index associated with a second plurality of text files to thereby create a merged index, wherein:

the first index is partitioned into a plurality of first voronoi cells, each first voronoi cell of the plurality of first voronoi cells being associated with a respective first key-value mapping of a plurality of first key-value mappings, each first key of the respective first key-value mapping identifying a respective first voronoi cell of the plurality of first voronoi cells, and each first value of the respective first key-value mapping identifying first vector embeddings associated with the first plurality of text files associated with the respective first voronoi cell of the plurality of first voronoi cells, and the second index is partitioned into a plurality of second voronoi cells, each second voronoi cell of the plurality of second voronoi cells being associated with a respective second key-value mapping of a plurality of second key-value mappings, each second key of the respective second key-value mapping identifying a respective second voronoi cell of the plurality of second voronoi cells, and each second value of the respective second key-value mapping identifying second vector embeddings associated with the second plurality of text files associated with the respective second voronoi cell of the plurality of second voronoi cells;

processing the first plurality of text files and the second plurality of text files into a plurality of chunks;

embedding each of the plurality of chunks with a trained encoder model to produce third vector embeddings;

generating the merged index based on the third vector embeddings and a distance metric;

partitioning the merged index into a plurality of third voronoi cells based on the third vector embeddings;

storing the merged index partitioned into the plurality of third voronoi cells as a plurality of third key-value mappings, wherein:

each third key of a respective third key-value mapping of the plurality of third key-value mappings identifying a respective third voronoi cell of the plurality of third voronoi cells, and each third value of the respective third key-value mapping of the plurality of third key-value mappings identifying third vector embeddings associated with the first plurality of text files and the second plurality of text files associated with the respective third voronoi cell of the plurality of third voronoi cells, receiving, from a user, a query for the first plurality of text files and the second plurality of text files;

creating a query embedding based on the query, wherein the query embedding has a lower dimensionality than the query;

identifying a select third key-value mapping comprising a select third key and a select third value, the select third key associated with a select third voronoi cell of the plurality of third voronoi cells and corresponding to the query embedding;

obtaining a set of third vector embeddings associated with the select third value of the select third key-value mapping, the set of third vector embeddings being associated with the select third voronoi cell;

comparing the query embedding to the set of third vector embeddings to determine one or more closest vector embeddings, such that the third vector embeddings from the select third voronoi cell that corresponds to both the first plurality of text files and the second plurality of text files are searched to generate a response to the query, thereby improving a query response time; and generating a textual output based on the one or more closest vector embeddings.

11. The method of claim 10, further comprising compressing the third vector embeddings prior to generating the merged index.

12. The method of claim 10, wherein the distance metric comprises one of:
- an Euclidean distance, or
- a cosine similarity.

13. The method of claim 10, wherein the first index associated with the first plurality of text files and the second index associated with the second plurality of text files are obtained via a LangChain framework.

14. A processing system, comprising:
- a memory comprising computer-executable instructions; and
- a processor configured to execute the computer-executable instructions and cause the processing system to:
  - receive, from a user, a plurality of input text files;
  - receive, from the user, a query for the plurality of input text files;
  - obtain an index associated with the plurality of input text files to process the query, wherein:
    - the index is partitioned into a plurality of voronoi cells,
    - each voronoi cell of the plurality of voronoi cells being associated with a respective key-value mapping of a plurality of key-value mappings,
    - each key of the respective key-value mapping identifying a respective voronoi cell of the plurality of voronoi cells, and
    - each value of the respective key-value mapping identifying vector embeddings associated with a plurality of text files associated with the respective voronoi cell of the plurality of voronoi cells;
  - create a query embedding based on the query using a trained encoder model, wherein the query embedding has a lower dimensionality than the query;
  - identify a first key-value mapping comprising a first key and a first value, the first key associated with a first voronoi cell of the plurality of voronoi cells and corresponding to the query embedding;
  - obtain a first set of vector embeddings associated with the first value of the first key-value mapping, the first set of vector embeddings being associated with the first voronoi cell;
  - compare the query embedding to the first set of vector embeddings to determine one or more closest vector embeddings such that vector embeddings belonging to less than all voronoi cells of the plurality of voronoi cells are searched to generate a response to the query, thereby improving a query response time; and
  - generate a textual output based on the one or more closest vector embeddings.

15. The processing system of claim 14, wherein the processor is further configured to cause the processing system to:
- obtain a second set of vector embeddings associated with a second value of a second key-value mapping, the second key-value mapping comprising a second key associated with a second voronoi cell neighboring the first voronoi cell; and
- compare the query embedding to the second set of vector embeddings to determine the one or more closest vector embeddings.

16. The processing system of claim 14, wherein to compare the query embedding to the first set of vector embeddings comprises the processor being configured to cause the processing system to calculate a distance metric between the query embedding to each vector embedding in the first set of vector embeddings.

17. The processing system of claim 16, wherein the distance metric comprises one of:
- an Euclidean distance, or
- a cosine similarity.

18. The processing system of claim 14, wherein the plurality of input text files and the query are received via an interface of a large language model (LLM).

19. The processing system of claim 14, wherein the index associated with the plurality of input text files is obtained via a LangChain framework.

20. The processing system of claim 14, wherein the processor is further configured to cause the processing system to, prior to creating the query embedding:
- processing text of the query into a plurality of chunks; and
- removing one or more of the plurality of chunks of the query associated with one or more stop words to generate a pre-processed query, wherein the pre-processed query is embedded to create the query embedding.

* * * * *